April 27, 1965 J. E. MONELL 3,180,602
ADJUSTABLE CONVEYOR STAND
Filed Jan. 29, 1964 3 Sheets-Sheet 1

INVENTOR.
JOHN E. MONELL
BY *Hodges*
ATTY.

INVENTOR.
JOHN E. MONELL

April 27, 1965    J. E. MONELL    3,180,602
ADJUSTABLE CONVEYOR STAND
Filed Jan. 29, 1964    3 Sheets-Sheet 3
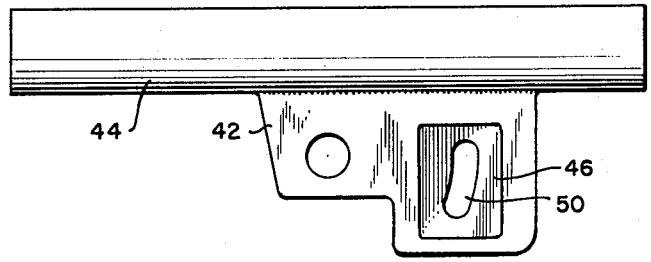
FIG. 4.
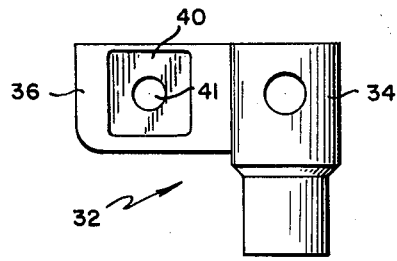  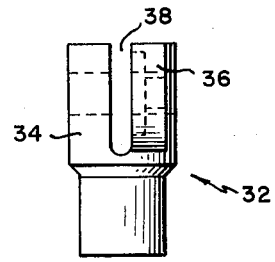
FIG. 5.    FIG. 6.
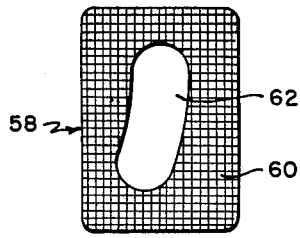    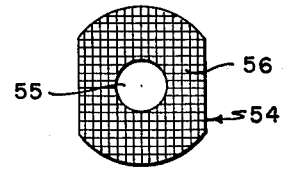
FIG. 8.    FIG. 7.
INVENTOR.
JOHN E. MONELL
BY
ATTY.

United States Patent Office 3,180,602
Patented Apr. 27, 1965

3,180,602
ADJUSTABLE CONVEYOR STAND
John E. Monell, 1113 Plover Drive, Baltimore, Md.
Filed Jan. 29, 1964, Ser. No. 341,150
4 Claims. (Cl. 248—170)
(Granted under Title 35, U.S. Code (1952), sec. 266)

The invention described herein may be manufactured and used by or for the Government of the United States of America for governmental purposes without the payment of any royalties thereon or therefor.

This invention relates to supports, and more specifically to a stand for supporting an object at a desired height and angular disposition.

It is often desirable to support an object at an angle other than that at which the surrounding ground, floor, or deck is disposed. For example, on a ship's deck, which is convex from port to starboard and concave from bow to stern (camber and sheet), it is often necessary to support gravity type conveyors level, or at an angle from end to end. Therefore, the conveyor cannot rest directly on the deck. Heretofore the conveyors have been supported on stands which must be propped with wedges and the like to compensate for the unlevel surface of the deck. While this method has been tolerable, it is tedious and time-consuming, and a more efficient and effective means for supporting conveyors is needed.

Accordingly, it is an object of this invention to provide a stand which is capable of supporting an object at an angle other than that at which the surrounding ground, floor, or deck is disposed.

It is another object of this invention to provide a stand capable of supporting an object at a desired height and angular disposition.

It is still another object of this invention to provide a conveyor stand which may be used in combination with similar stands to support a conveyor level, or at an angle from end to end on a ship's deck which is not level.

It is a further object of this invention to provide a stand which is easy to store and handle, and which is vertically and angularly adjustable to support an object at a desired attitude.

It is a still further object of this invention to provide a lightweight folding conveyor stand which will support a conveyor at a desired attitude on a ship's deck, without the use of wedges or the like to prop the stand.

Yet a further object of this invention is to provide improved means for preventing relative movement between two adjacent plates which are otherwise relatively movable.

Other objects and many of the attendant advantages of this invention will be readily appreciated as the same becomes better understood by reference to the following detailed description when considered in connection with the accompanying drawings wherein:

FIG. 4 is an elevation view of the pivot plate and cross-brace of the stand;

FIG. 5 is an elevation of the support member of the stand;

FIG. 6 is an end view of the support member of FIG. 5; and

FIGS. 7 and 8 show the cooperating serrated friction plates used in the stand.

Figure 1:
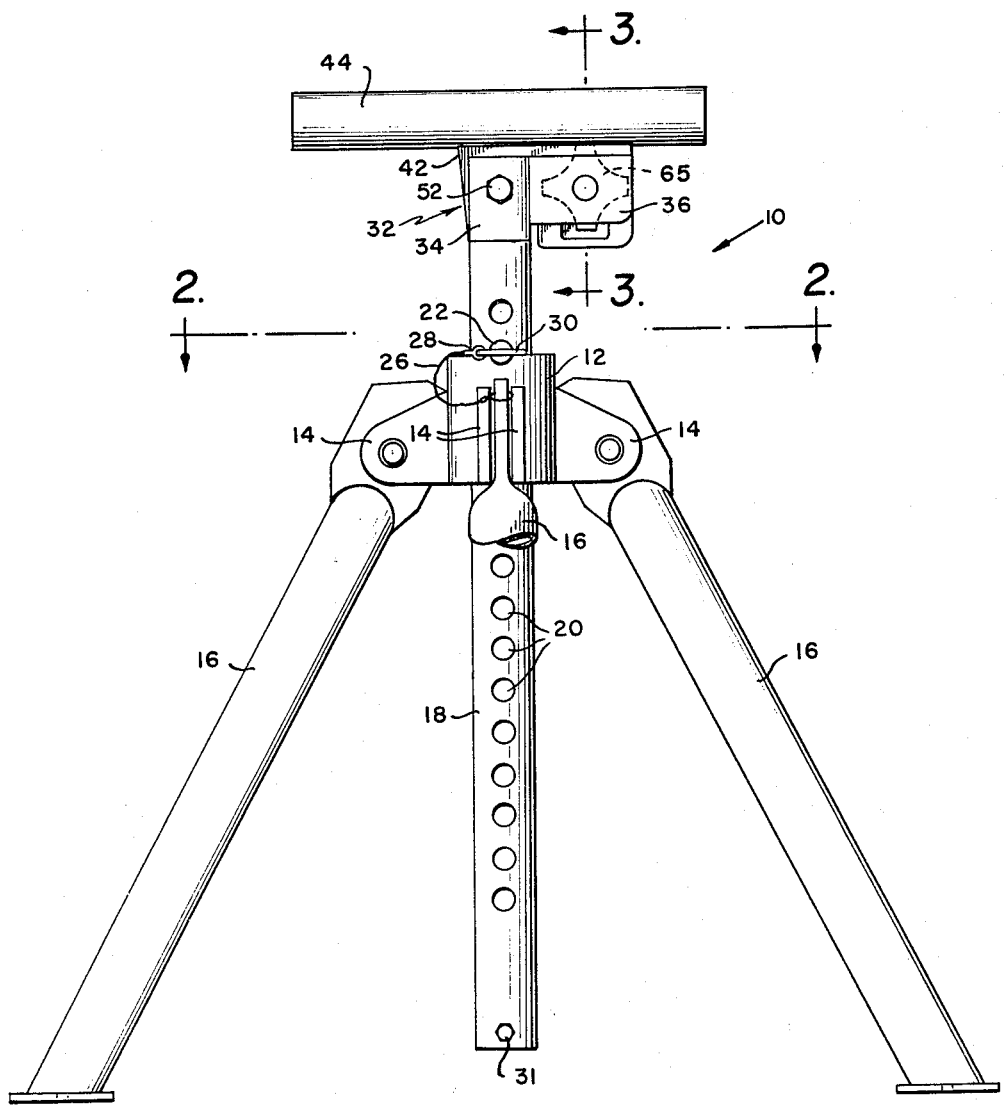
FIG. 1 is an elevation view of a preferred embodiment of the stand of this invention.
Figure 2:
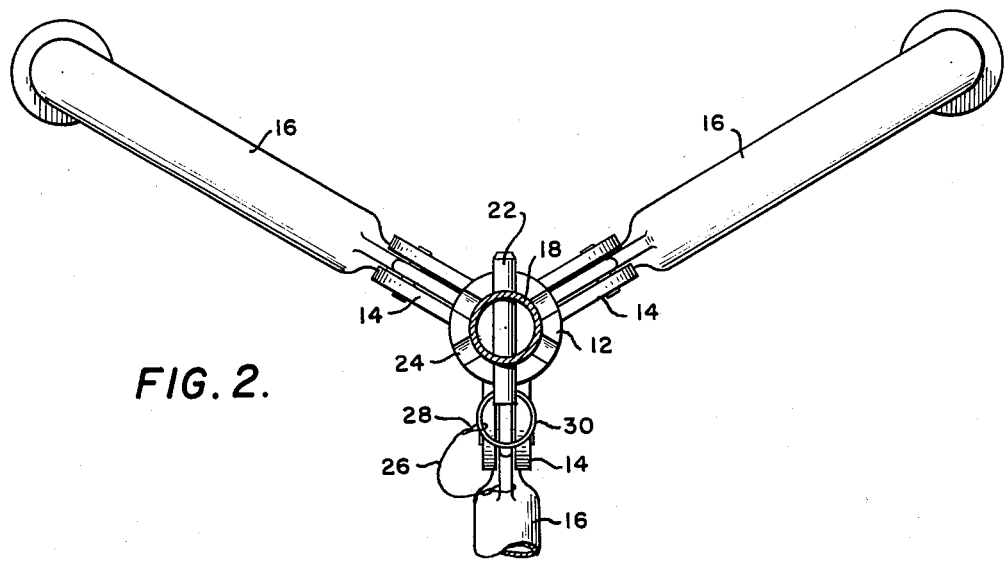
FIG. 2 shows a section of the stand taken on the line 2—2 of FIG. 1 looking in the direction of the arrows.

Referring now to the drawings, wherein like reference characters designate like or corresponding parts throughout the several views, there is shown in FIGS. 1 and 2, the stand 10 which includes a base member in the form of a cylindrical tubular standard 12 having flanges 14 extending radially outward therefrom. Legs 16 support standard 12, and are pivotally hinged to flanges 14 so that they may be folded to facilitate storage of the stand. A height adjusting post 18 having a plurality of vertically spaced holes 20 therethrough is longitudinally movable through standard 12, and a locking pin 22 extends through any of the holes 20 to maintain the post at any desired height.

As best seen in FIG. 2 semi-circular recesses 24 are radially disposed in standard 12 to seat pin 22; and a retaining cable 26, a swage sleeve 28, and a split ring 30 may be employed to attach pin 22 to standard 12 to prevent loss of the pin. A screw 31 and nut (not shown) may be inserted through the lower end of post 18 to prevent inadvertent removal of the post from standard 12. A support member 32, shown in detail in FIGS. 5 and 6, has a cylindrical portion 34 coaxially secured on the upper end of post 18, and a flat plate portion 36 extending outwardly therefrom. The cylindrical portion has a slot 38 extending transversely thereacross, and the flat plate portion has a recess 40 therein and a hole 41 therethrough.

Figure 3:
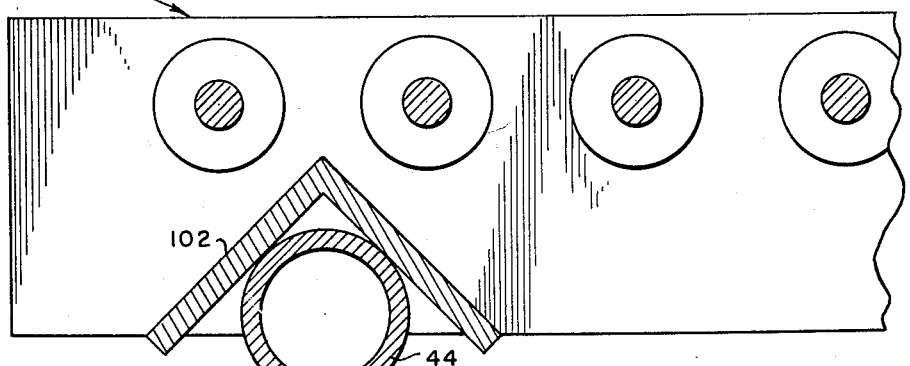
FIG. 3 shows a section of a portion of the stand taken along the line 3—3 of FIG. 1 looking in the direction of the arrows and having the end of a gravity-type conveyor resting thereon.

Seated in slot 38 is a pivot plate 42 with a cross brace 44 secured thereon. Pivot plate 42 extends outwardly beyond the confines of slot 38 and is disposed parallel to and adjacent the flat plate portion 36 of the support member. As best shown in FIGS. 3 and 4, pivot plate 42 has a recessed portion 46 in its surface that faces recess 40 and an elongated curved slot 50 extending therethrough. A cap screw 52 and bushing (not shown) extend through holes in the cylindrical portion 34 of support member 32 and pivot plate 42 to pivotally secure the plate in slot 38. A lock nut may be secured on the end of cap screw 52 to prevent the screw from sliding out of the bushing. The length of the cross brace 44 will vary according to the width of the object to be supported.

FIG. 3 shows the means employed to selectively prevent or enable relative angular movement between the pivot plate 42 and support member 32. A first friction plate 54 having serrations 56 in one surface thereof is seated in, but not secured in, recess 40 in flat plate portion 36; and a second friction plate 58 having serrations 60 in one surface thereof is cemented or otherwise suitably secured in recess 46 in pivot plate 42.

As can be seen in FIGS. 3, 7, and 8, serrated friction plate 54 has a hole 55 therein which coincides with hole 41 in flat plate portion 36, and serrated friction plate 58 has a curved slot 62 therethrough which coincides with curved slot 50 through pivot plate 42. A threaded stud 64 passes through holes 41 and 55 and curved slots 50 and 62, and has a hand knob 65 secured on one end thereof via roll pin 66. A splined, internally threaded nut 68 is pressed in the non-recessed surface of flat plate portion 36 to receive stud 64. A cotter pin 70 may be employed to prevent inadvertent removal of stud 64 from nut 68.

From a close comparison of FIGS. 3, 5 and 7, it will be seen that the friction plate 54 has rounded upper and lower edges (FIG. 7) which are approximately tangent to the upper and lower walls of the recess 40 (FIG. 3). Therefore, with the plate 54 in place in the recess, it is restrained against movement parallel to its straight edge portions. Further examination of the proportions of the friction plate 54 (FIG. 7) shows that the maximum distance between its curved or rounded edges is considerably greater than the distance between its straight edges. Yet, the sidewise proportions of the recess 40 closely approximate a square. The friction plate 54 when placed within recess 40 (in the orientation as appearing on the sheet) cannot therefore more appreciably up and down, and cannot move in translation appreciably side to side because such movement is limited by the threaded stud 64 passing thru aperture 55. However, it is obvious that the friction plate 54 may rotate about the axis of stud 64 to a limited extent in recess 40—the extent being obviously determined by the ratio of the overall length-wise/widthwise dimensions of the plate 54 in relation to corresponding dimensions of the recess.

It is therefore true that while the plate 54 is not secured in the recess 40, its movement therein is essentially rotational and only very slightly translational.

The stand may be made of lightweight material such as aluminum for ease in handling.

When using stands of the type described hereinabove to support a gravity-type conveyor on a non-level surface such as a ship's deck, the conveyor 100 having an angle bar 102 attached thereunder, is seated on cross braces 44 of two or more stands (see FIG. 3). The post 18 is raised or lowered in standard 12 until the cross brace 44 is at the desired height.

In order to adjust the angle of the cross brace, hand knob 65 is turned to unscrew threaded stud 64 from nut 68. Now the pivot plate 42 may be rotated or pivoted about screw 52 until the ends of curved slots 50 and 62 abut the screw. Since serrated friction plate 54 is not secured in recess 40, it is free to move or float therein thereby permitting proper alignment of the serrated surfaces of friction plates 54 and 58 when pivot plate 42 and attached friction plate 58 are rotated or pivoted relative to flat plate portion 36. The feature of the floating friction plate arrangement is advantageous since it permits the friction plates to move relative to one another without mashing or stripping the serrated surfaces.

When the cross brace is at the desired angle, hand knob 65 is turned to screw threaded stud 64 in nut 68 to tighten and compress pivot plate 42 and flat plate portion 36 together, as well as friction plates 54 and 58. The locking action of the friction plates insures that plates 42 and 36 will not slide relative to one another.

While the stand has been described as used in conjunction with a conveyor on a ship's deck, it should be understood that it may be used whenever it is desired to support an object at an attitude other than that of the surrounding ground, floor, or deck. Furthermore, the use of serrated friction plates one of which may float in a recess of one member, and the other of which is secured in a recess of a second member may be utilized wherever it is desired to selectively prevent and enable sliding and/or rotating movement between the two members.

Obviously many modifications and variations of the present invention are possible in the light of the above teachings. It is therefore to be understood that within the scope of the appended claims the invention may be practiced otherwise than as specifically described.

What is claimed is:

1. An angularly and vertically adjustable lightweight folding conveyor stand comprising:
    a vertically extending tubular standard having vertically disposed flanges extending radially therefrom;
    at least three legs pivotally hinged to said flanges to support said tubular standard;
    a height adjusting post telescopically received in said tubular standard;
    said height adjusting post having a plurality of vertically spaced holes therethrough for receiving a lock pin;
    a lock pin adapted to extend through one of said holes in said height adjusting post to maintain said height adjusting post at a desired height;
    a support member secured on the upper end of said height adjusting post;
    said support member including a cylindrical portion mounted on the upper end of said height adjusting post, and a vertically disposed flat plate portion extending radially therefrom;
    said first plate portion having a recess in one surface thereof;
    a first friction plate seated in said recess;
    said first friction plate having a serrated surface facing out of said recess;
    a pivot plate pivotally attached to said support member at a point spaced from said recess in said flat plate portion of said support member;
    said pivot plate extending adjacent said flat plate portion, and having a recess therein facing said recess in said flat plate portion;
    a second friction plate seated in said recess in said pivot plate;
    said second friction plate having a serrated surface in contacting relationship with the outwardly facing serrated surface of said first friction plate; and
    means for pressing said pivot plate and said flat plate portion of said support member together to prevent relative movement therebetween;
    at least one of said serrated friction plates being unsecured in its recess so that it may turn therein;
    said serrated friction plate providing additional means for preventing relative movement between said pivot plate and said flat plate portion of said support member when the pivot plate and flat plate portion are pressed together; and
    a holding member secured on the upper end of said pivot plate for supporting the end of a conveyor thereon.

2. A stand according to claim 1, wherein:
    said second friction plate is secured in the recess in said pivot plate; and
    said first friction plate is unsecured in the recess in the flat plate portion of said support member, whereby it may turn therein to align with the serrations in said second friction plate.

3. Apparatus for rotatably adjusting the spatial orientation of a support member and for locking said member in position, comprising:
    a base member having an upper body portion;
    means located in said upper body portion for rotatably mounting said support member;
    said support member having a generally flat body extension radially displaced from the axis of rotation of said support member;
    a generally flat body member rigidly secured to the upper portion of said base member and extending in juxtaposing relation to the body extension of said support member;
    said body extension and said body member each having a recessed portion, said recessed portions facing each other;
    a first friction plate rigidly disposed in the recessed portion of said body extension, said friction plate and its associated recessed portion each having a curved slot, said curved slots overlying each other;
    a second friction plate disposed within and loosely confined in the recessed portion of said body member, said second friction plate and said body member each having an aperture, said apertures overlying each other;
    said curved slots and said apertures being overlyingly related;
    a threaded stud extending thru said slots and apertures;
    a locking unit rigidly coupled to said body member for receiving one end of said threaded stud;
    whereby upon rotation of said threaded stud in one directional sense, said friction plates are urged into engaging locking relation to each other thereby locking said support member in place, and upon rotation of said threaded stud in an opposite directional sense, said friction plates are disengageable from locking relation to each other enabling relative movement between said friction plates essentially free from resistance of the serrations of said plates, therefore, permitting rotational movement of said support member to the extent of said curved slots.

4. Apparatus according to claim 3 wherein said second friction plate has an oblong shape with a pair of opposing curved edges and a pair of opposing straight edges, the long dimension including the outermost portions of said curved edges; and wherein the recessed portion of said body member associated with said second friction plate is essentially square in plan, said second friction plate thereby being limited to essentially rotational movement and relatively slight translational movement within said recessed portion, whereby the amount of play between said second friction plate and its associated recessed portion is reduced to a minimum to insure accurate positioning of said support member during adjustment.

References Cited by the Examiner

UNITED STATES PATENTS

| 1,224,263 | 5/17 | Bolens | 297—373 |
| 2,502,667 | 4/50 | Pagett | 248—170 |
| 2,588,399 | 3/52 | McQuin | 248—170 |
| 2,794,612 | 6/57 | Clifton | 248—170 |

FOREIGN PATENTS

| 1,054,858 | 4/59 | Germany. |
| 625,839 | 7/49 | Great Britain. |

CLAUDE A. LE ROY, *Primary Examiner.*

FRANK L. ABBOTT, *Examiner.*